June 24, 1947.　　　J. P. TARBOX　　　2,423,056
BRAKE ROTOR
Filed March 1, 1945
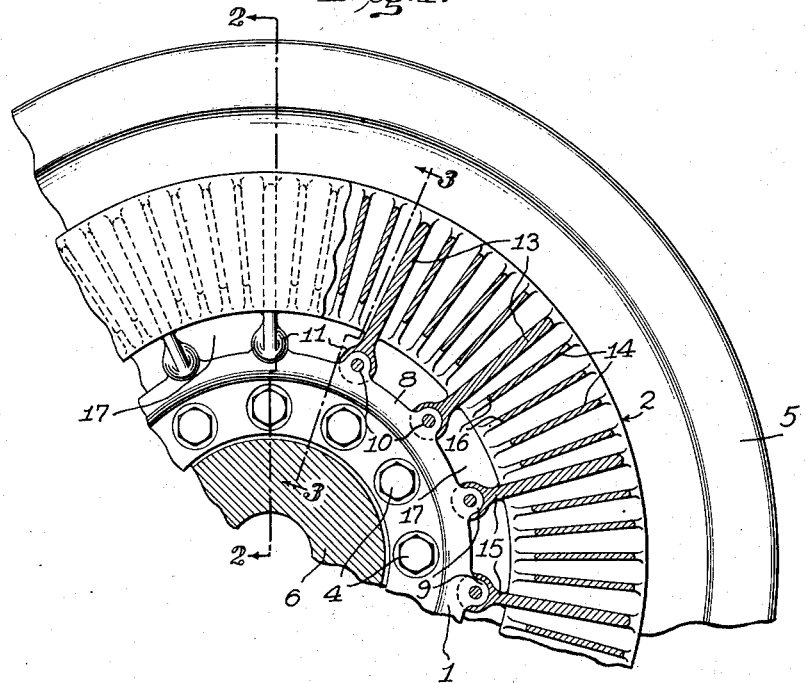
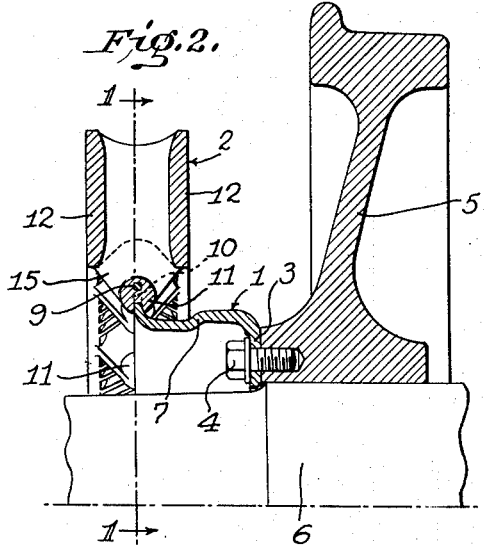
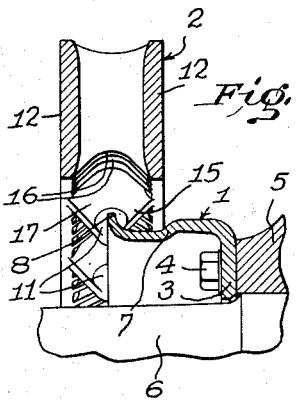
INVENTOR
John P. Tarbox Patented June 24, 1947

2,423,056

UNITED STATES PATENT OFFICE 2,423,056

BRAKE ROTOR

John P. Tarbox, Philadelphia, Pa., assignor to The Budd Company, Philadelphia, Pa., a corporation of Pennsylvania Application March 1, 1945, Serial No. 580,336

3 Claims. (Cl. 188—218)

The invention relates to a brake rotor of the class having radial braking faces and adapted to be secured to a wheel to rotate therewith.

Such rotors are adapted to cooperate with other brake elements commonly called stators which engage the radial braking faces of the rotor to effect the braking of the wheel with which it is associated.

The invention is an improvement of the class of rotors disclosed and claimed in copending application Serial No. 552,040 filed August 31, 1944, for Brake rotor.

It is a main object of the invention to lighten the overall construction of such rotors without material sacrifice of strength and to improve the cooling effect of the rotor.

Other and further objects and advantages and the manner in which they are attained will become apparent from the following detailed description of the invention when read in connection with the accompanying drawings forming a part of this specification.

In the drawings:

Fig. 1 is an end view of rotor as applied to a railway wheel and axle, parts being shown in elevation and parts in section, the section being taken substantially along the line 1—1 of Fig. 2;

Fig. 2 is a sectional view thereof, with the section taken substantially along the line 2—2 of Fig. 1 and;

Fig. 3 is a fragmentary sectional view, the section being taken substantially along the line 3—3 of Fig. 1.

The rotor according to the invention is preferably comprised of but two parts, a support member 1 and a combined brake and blower member 2. The support member preferably comprises a wrought metal web of tapered form having a radial flange 3 at its inner periphery which is adapted to be bolted through bolts 4 to the hub of a wheel 5 shown mounted on an axle 6. Outwardly of the flange 3 the web is extended in generally axial direction by portion 7 and its outer peripheral portion 8 is extended generally radially outwardly and provided with spaced projections 9. These projections are provided with means for interlocking with the member 2, in the form shown such means comprising holes 10 through the respective projections.

The combined brake and blower member 2 is preferably a unitary casting of a material, such as cast iron, best suited for cooperation with composition lining faced stators.

It comprises circumferentially spaced inner enlargements or bulbous portions 11 which are cast directly around the respective spaced projections 9 and through the holes 10 so as to provide a strong interlock therewith both radially and circumferentially.

On opposite sides of the bulbous portions 11 with their inner margins arranged some distance radially outwardly of them, are arranged two spaced plate-like members 12 having the braking faces, to be engaged by the brake stators, formed on their outer sides. These plate-like members are securely braced together by a plurality of closely spaced circumferentially and generally radially extending braces, certain of these braces as 13, every fifth one as shown in Fig. 1, are thicker and stronger than the others, designated 14, and are extended radially inwardly of the members 12 by tapered portions 15, Figs. 2 and 3, which terminate in the circumferentially spaced enlargements or bulbous portions 11 cast onto the support member 1. The lighter braces 14 on the other hand, terminate where they join the plate-like members 12 at their radially inner ends, but have their radially inner margins arched radially outwardly, as indicated at 16, Figs. 1 and 3.

It will be seen that this arrangement provides a very light but strong structure, since the outer periphery of the support forms, in effect, a continuous annulus joining together the inner bulbous extremities 11 of the cast metal brake and blower member 2.

Also, this arrangement provides very effective cooling means for the brake member, for as shown in Figs. 1 and 3, large openings, as 17, are provided between the outer periphery of the support web between adjacent spaced projections 9 and the surrounding bulbous extremities of the inward extensions of the braces 13 and the adjacent plate members 12 to allow the inrush of air at the radially inner side of the member equally from the opposite sides to the centrifugal blower formed by the construction described. This insures not only adequate cooling but also equal cooling of both plate-like members and consequent elimination of strains in the metal due to unequal cooling.

While a specific embodiment of the invention has been herein described in detail, it will be understood that changes and modifications may be made by those skilled in the art without departing from the main features of the invention, and such changes and modifications are intended to be covered in the appended claims.

What is claimed is:

1. A combined brake rotor and blower comprising spaced annular plate members joined together at circumferentially spaced points by generally radially extending braces, at least certain of said braces having inward extensions terminating inwardly of the plate members in circumferentially spaced bulbous extremities, all said parts forming an integral casting, and a support member having a peripheral portion having generally radially extending faces cast into said bulbous extremities.

2. A combined brake rotor and blower comprising spaced annular plate members joined together at circumferentially spaced points by generally radially extending braces, at least certain of said braces having inward extensions projecting radially inwardly beyond said plate members and terminating in circumferentially spaced enlarged extremities, all said parts forming an integral casting, and a support member of web form having its periphery formed with spaced radially outwardly extending projections, said projections being embedded in the respective enlarged extremities of said braces.

3. A combined brake rotor and blower comprising spaced annular plate members joined together at circumferentially spaced points by generally radially extending braces, at least certain of said braces having inward extensions projecting radially inwardly beyond said plate members and terminating in circumferentially spaced extremities disposed, radially a substantial distance inwardly of and axially centrally between, said spaced plate members, and a support member of web form having generally radially extending peripheral portions spaced circumferentially corresponding to the spacing of said extremities and cast into the respective extremities.

JOHN P. TARBOX.

REFERENCES CITED

The following references are of record in the file of this patent:

UNITED STATES PATENTS

| Number | Name | Date |
| --- | --- | --- |
| 2,129,199 | Dake | Sept. 6, 1938 |
| 2,215,420 | Eksergian | Sept. 17, 1940 |
| 2,345,016 | Tack | Mar. 28, 1944 |
| 2,255,024 | Eksergian | Sept. 2, 1941 |